UNITED STATES PATENT OFFICE.

BENJAMIN TALBOT, OF PENCOYD, PENNSYLVANIA.

ART OF REFINING METALS.

SPECIFICATION forming part of Letters Patent No. 639,872, dated December 26, 1899.

Application filed February 12, 1898. Serial No. 670,060. (No specimens.)

*To all whom it may concern:*

Be it known that I, BENJAMIN TALBOT, a resident of Pencoyd, in the county of Montgomery, State of Pennsylvania, have invented certain new and useful Improvements in the Art of Refining Metals, of which the following is a specification.

My invention is more particularly a process for use in refining iron. Its principal objects are to produce a product of the degree of purity that may be desired by a continuous operation of refining and mixing, to provide a suitable supply of metal refined to the grade required for the further refining operations of smaller furnaces, and to attain these results in a rapid and economical manner.

I have heretofore invented a process of purifying iron which contemplates pouring or filtering the molten impure metal through a bath of liquid basic slag contained in a suitable receptacle, by which the metalloids or other impurities of the iron are caused to combine with the basic elements of the slag, permitting the metal thus purified to be drawn from below, where it sinks by reason of its greater specific gravity, as will more fully appear by reference to Letters Patent of the United States No. 476,091.

My present invention contemplates the use of a reservoir-furnace of suitable construction conveniently located for receiving charges from one or more blast or cast-iron-producing furnaces. In this furnace such charges are purified or partially purified as well as mixed to a uniform composition, and this reservoir of metal serves as a source of supply for one or more refining-furnaces, in which the process of purification is continued or completed. The desired degree of purity may vary according to the further refining operations of the smaller furnaces. If the partially-refined metal is to be worked further with a considerable percentage of scrap iron or steel (decarbonized metal) mixed therewith, then the carbon may be higher than if it is to be worked into steel by itself or with only a small percentage of scrap. In all cases silicon is oxidized in the reservoir-furnace to that point which is satisfactory for the furthur operations of the refining-furnace. When the liquid impure pig metal is phosphoric, some of this impurity is eliminated in the reservoir-furnace and the remainder with the remaining silicon, if any, in the refining-furnace; and to accomplish this removal of the phosphoric impurities the furnace should be suitably lined, either basic or neutral, so that an effective basic slag can be operated which is capable of holding phosphoric acid. When the metal treated is sufficiently low in phosphorus, so that this impurity need not be considered in the reservoir-furnace, then such furnace may have an acid lining and the oxid of iron in the slag will act on the silicon and carbon. In this operation the reservoir-furnace is preheated and provided with an initial charge or partial charge of purified or partially-purified molten metal refined to the desired degree by means of oxid-of-iron and other slag-forming additions, such as lime and limestone, either in the reservoir-furnace or any other furnace adapted for such purpose. This initial charge is provided with a covering of slag containing oxid of iron formed by additions in either liquid or solid form of iron cinders, scales, ores, or other material economical for this purpose, as lime and limestone, or such covering may be provided by the oxidation resulting from the furnace and atmospheric action on the initial and subsequent charges or by the excess of material added for the purification of the initial charge. It will be understood that the oxidizing character of such slag-covering must be maintained by the addition or accretion of oxid of iron from time to time and by the withdrawal of the slag exhausted of its oxid-of-iron contents. Partial charges of molten impure metal are from time to time poured into the bath contained in the reservoir-furnace, and by filtration through the covering of slag and admixture with the purified or partially-purified metal in the furnace this added metal becomes refined to the desired degree of purity and a uniform product is obtained. The filtering operation and the circulation of the furnace contents brings the metal into contact with the slag, effecting the separation of the metalloids and other impurities from the iron and metallic iron from the slag. The impure metal when poured into the furnace, being lighter than the purer metal of the charge contained therein, will rise to the top and come into contact with the slag-covering, the furnace action facilitating this operation of bringing the impure metal into contact with the slag and advances the operation of purification. It will be understood that this operation of charging metal into the reservoir-furnace from sources supplying various grades of iron and of drawing off the metal when purified to the desired degree and mixed to a uniform composition is a continuous operation and that marked economy results from thus supplying a reservoir of metal of a desired degree of refinement for the operations of a number of other furnaces of smaller capacity, which work it into steel.

When it is desired to produce only a desiliconized metal in the furnace and to retain the carbon contents therein, this may be accomplished to the extent desired and a product of the desired grade produced, since the silicon is removed first and the carbon thereafter. Refined cast-iron or metal above the steel limit in carbon may thus be produced and may be poured into a bath of purer metal in another furnace, being thus worked into steel by continuous liquid refining, or this metal may be taken in liquid condition, preferably, or in solid condition to another furnace, such as an open-hearth or regenerative furnace, and there worked into steel either by itself or mixed with scrap-iron or scrap-steel.

When it is desired to make puddle-iron from desiliconized cast-iron, metal can be taken, preferably in liquid condition, and poured into various puddling-furnaces, there to be worked down rapidly into malleable iron. If the puddlers' cinder is sufficiently pure from puddling this refined iron, it may be returned, preferably in liquid condition, to the desiliconizing-furnace.

The furnace adopted as the reservoir may be a usual form of the tilting variety, with a delivery-spout at or above the level of the liquid bath, which is capable of being tilted so as to pour off either metal or slag intermittently through one or more spouts, or the operation may be carried on in a fixed hearth by having a number of tap-holes at various levels in the bath.

The metal to be treated containing carbon as well as other impurities, the furnace can be worked at comparatively low temperatures, since the impure metal is more fluid at a given temperature than a pure metal.

Having thus described the nature of my invention and the manner in which the same is to be performed, I claim—

1. In the art of refining iron, the process which consists in providing a heating-furnace with an initial charge of purified or partially-purified molten metal having a covering of slag capable of removing silicon, intermittently charging impure metal into said furnace charge of purer metal through said covering of slag, and as said furnace charge becomes refined to the desired degree, intermittently withdrawing portions of the same and subjecting such portions to further refinement in a second furnace, as specified.

2. The process of refining metal, as herein described, which consists in providing a furnace with a charge of refined or partially-refined metal, providing a covering of slag containing metallic oxid for the same, pouring charges of unrefined metal into the charge of purer metal in said furnace and subjecting the mixture to the heating action of said furnace, withdrawing portions of said mixture when it has reached the desired degree of purification, and subjecting said withdrawn portions of partially-purified metal to further refinement in a second furnace, for the purpose set forth.

3. In the art of refining iron the process which consists in providing a heating-furnace with an initial charge of purified or partially-purified molten metal having a covering of basic slag, intermittently charging impure metal into said furnace charge of purer metal through said covering of slag, and as said furnace charge becomes refined to the extent desired, intermittently withdrawing portions of the same and subjecting said portions to further refinement, substantially as specified and for the purpose set forth.

Dated this 11th day of February, A.D. 1898.

BENJAMIN TALBOT.

Witnesses:
THOMAS S. GATES,
CHARLES N. BUTLER.